Nov. 3, 1931.  I. E. SPROAT  1,830,489
COLORED GRANULE, ETC
Filed April 18, 1929
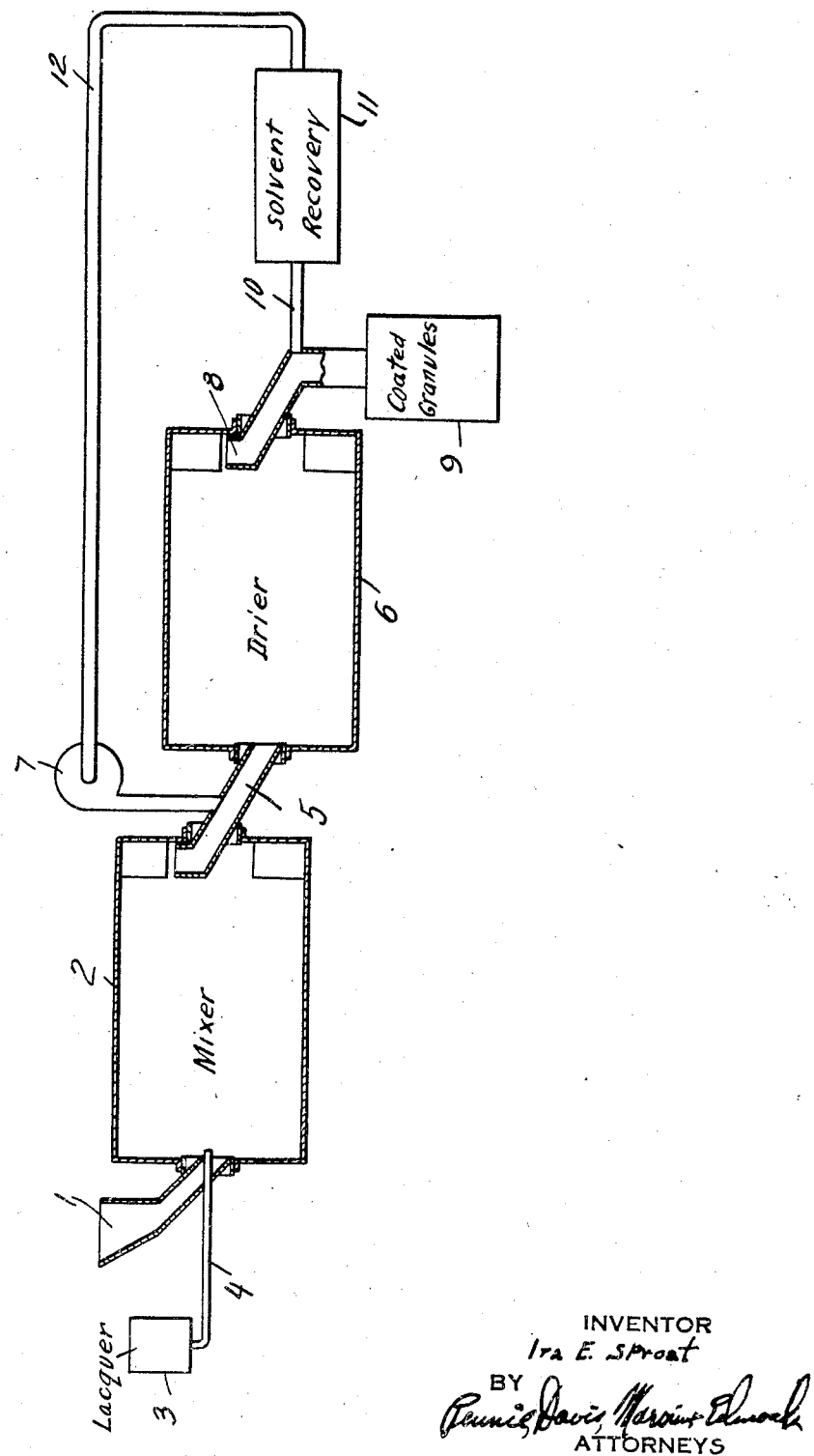
INVENTOR
Ira E. Sproat
BY
ATTORNEYS Patented Nov. 3, 1931

1,830,489

UNITED STATES PATENT OFFICE

IRA ELMER SPROAT, OF COVINGTON, OHIO, ASSIGNOR TO R. T. VANDERBILT COMPANY, INCORPORATED, OF NEW YORK, N. Y., A CORPORATION OF NEW YORK

COLORED GRANULE, ETC.

Application filed April 18, 1929. Serial No. 356,084.

This invention relates to new colored granules suitable for surfacing roofing or for architectural surfaces. More particularly the invention is concerned with colored granules produced by coloring crushed rock or similar material without substantially changing its size or formation and without the use of expensive apparatus or high temperatures.

It has been the practice for a long time in the manufacture of roofing materials to press a layer of crushed rock into the upper surface of the bituminous or mineral cement which forms the body of the roofing material. This layer of rock serves at the same time to protect the body of the roofing material from the weather and, particularly in the case of crushed slate, to give to the surface a color which is more pleasing than that of the body of the material.

In the past the colors which it has been possible in this manner to provide on roofing materials has been limited by the range of naturally occurring minerals which could be obtained in quantity and at a price such as to permit of their use in this manner.

I have now discovered a process by which such granules of rock or similar material can be given almost any desired color without impairing its desirable qualities and with only a slight increase in the cost of the material.

By my new process I am enabled to produce a permanent color on the material without the use of high temperatures and with only the simplest of apparatus.

In the accompanying drawing I have illustrated an apparatus suitable for use in preparing my new colored granules.

To prepare my new granules, the rock or other similar material is crushed to the desired size and is then treated with a solution of cellulose or cellulose derivatives, such as the ordinary brushing or spraying lacquer, which contains suitable dyes or pigments to provide the desired color. The solutions which I prefer to use are those which have been developed for finishing automobiles, as these have been designed to withstand severe conditions of weathering while retaining their color and finish. Such lacquers may be obtained in a wide variety of colors.

The lacquer may be applied to the granules in any suitable manner. However, I have discovered that elaborate preparation of the material is not essential and that the application of the lacquer to the granules may be accomplished at almost negligible expense by the use of an apparatus such as I have illustrated diagrammatically in the drawing.

The granules of crushed rock of suitable size and previously freed from pulverized rock by screening or passing through an air current or by other suitable means, are supplied to the hopper 1, from which they fall into the rotary mixer 2. The lacquer is contained in the reservoir 3, from which it may be fed by gravity or suitable pressure through the pipe 4, into the mixer 2.

The mixer 2 is of a size and rotates at a speed such that the granules are thoroughly mixed together and coated with a thin layer of the lacquer during their passage through the mixer. The amount of lacquer which is admitted into the mixing chamber is proportioned to the charge of granules, so that each granule will be covered with a continuous thin layer of the lacquer without leaving any excess to be drained from the coated granules.

The granules, after they are thoroughly coated with the lacquer, are caught in the trough 5 and transferred thereby to a second rotary mixer 6. In the second mixer a draft of a suitable gas, preferably an inert gas such as carbon dioxide, or nitrogen, is maintained by the blower 7. This mixer may be heated by suitable means in order to hasten the drying operation or the stream of gas which is supplied thereto may be heated. Such heating, however, is not essential. The rotation of the mixer 6, causes the granules to fall over each other and through the space within the mixer, thereby preventing them from adhering to each other in a solid mass and also repeatedly presenting fresh surfaces to the drying action of the stream of gas.

The granules which have passed through the drying mixer 6 and thereby have had their coating thoroughly dried, are collected by the trough 8 and transferred to any suitable receptacle 9. The vapors of the solvent are preferably drawn off through the conduit 10 to a solvent recovery apparatus 11, where the vapors are condensed and recovered in a form suitable for reuse in the manufacture of more cellulose lacquer. The gases which pass off from the solvent recovery apparatus are preferably returned to the blower 7 by the conduit 12, thus avoiding the discharge of objectionable odors into the atmosphere and retaining any unrecovered solvent, or inert gas if such is being used, within the cycle.

It is to be understood that the above described apparatus is merely exemplary and that the preparation of my colored granules is not limited to the use of the particular apparatus described. I have indicated the mixers as being of the common type of continuous mixers such as are used in the mixing of Portland cement to form concrete. However, many different types of mixing apparatus will be recognized as more or less suitable for use in preparing my colored granules. Instead of using a continuous mixer the operation may be made intermittent, the mixer being fully charged and operated until the mixing is complete and then the entire charge transferred to the drying mixer; or the coating and drying may be formed in the same mixer, by first introducing the charge of granules and lacquer, then operating the mixer until the coating is complete and thereafter introducing a stream of a drying gas until the solvent is substantially evaporated and carried off, after which the charge may be removed from the mixer and transferred to any suitable receptacle.

Instead of drying the granules in a mixing apparatus as described, they may be projected into a drying medium in a manner such that they remain separate until the coating is substantially dried. A suitable apparatus for this purpose is a tower of sufficient height so that the granules, when dropped from the top, will be substantially dried before they reach the bottom. A strong upward current of a drying gas in the tower will increase the rate of drying and decrease the velocity of falling, so that the height of the tower in such case may be materially reduced. The granules may be introduced into such a tower through a suitable nozzle or by distributing from a rotary disk or any other convenient manner which will distribute the granules more or less evenly throughout the tower.

While I have found that it is desirable to use colored lacquers such as are prepared for use on automobiles, it is possible in some instances to use a clear lacquer and introduce the color in dry form with the granules.

Following the method which I have described above, I am able to produce almost any desired color on the granules without substantially changing their form or their suitability for any of the purposes for which crushed slate or ceramic granules are used.

In the case of the darker colors, almost any kind of rock suitably crushed may be used with my process. With the lighter colors, however, I find that a white or colorless mineral is necessary to produce the best results and for this purpose, where a particularly fine result is required, I have found that the mineral pyrophyllite is preeminently suitable. Since many lacquers give films that are more or less translucent, the use of different mineral granules having different natural colors or shades makes it possible to obtain a variety of shades with the same lacquer; and thus by mixing a number of different kinds of granules variegated effects might be obtained.

While I have described the granules above as being intended for use on roofing materials, it is to be understood that the colored granules are equally suitable for use in surfacing stucco or plaster on exterior or interior walls or in other places and with other types of material where a rough surface of a colored material is required.

It has been proposed prior to my invention to coat roof surfacing grit with a material made from a drying oil and a pigment. Such a method, however, is quite unsatisfactory, since the time required for drying the oil is so great that any possible method of keeping the granules separated during the drying and prior to application to the surface where they are to be used is prohibitively expensive. I have discovered, however, that lacquer such as cellulose lacquer not only dries quickly so as to permit its economical application to the granules, but, if it is suitably agitated, as described above, during the drying process, that each granule retains its continuous coating of dried lacquer substantially unimpaired and without adhering to other granules.

I claim:

1. Granules of crushed rock or similar materials enveloped in a thin film of a cellulose derivative, said film containing a suitable weatherproof coloring material.

2. Granules suitable for facing architectural surfaces, and the like, comprising granules of a crushed mineral enveloped in a translucent film of cellulose nitrate, said film containing a suitable weatherproof coloring material.

In testimony whereof I affix my signature.

IRA E. SPROAT.